United States Patent

[11] 3,537,420

| [72] | Inventors | Gerard Chollet and<br>Daniel Giorgi, Saint-Nazaire; Didier Costes,<br>Paris, and Paul Thome, Saint-Cloud, France |
|---|---|---|
| [21] | Appl. No. | 706,820 |
| [22] | Filed | Feb. 20, 1968 |
| [45] | Patented | Nov. 3, 1970 |
| [73] | Assignee | Commissariat A L'Energie Atomique<br>Paris, France |
| [32] | Priority | Feb. 24, 1967 |
| [33] | | France |
| [31] | | 96,491 |

[54] NUCLEAR REACTOR WITH INTEGRATED HEAT EXCHANGERS
14 Claims, 6 Drawing Figs.

[52] U.S. Cl...................................................... 176/65,
176/87, 122/510, 165/72, 165/78
[51] Int. Cl........................................................ G21c 19/20,
F22b 37/24

[50] Field of Search.......................................... 176/37, 38,
87, 65; 165/72, 76, 78; 122/32, 510

[56] References Cited
UNITED STATES PATENTS
3,410,752  11/1968  Dell.............................. 176/87X
FOREIGN PATENTS
1,504,486  10/1967  France ......................... 176/65

Primary Examiner—Carl D. Quarforth
Assistant Examiner—Harvey E. Behrend
Attorney—Cameron, Kerkam & Sutton ABSTRACT: In order to permit the withdrawal of any one heat exchanger block from a nuclear reactor of the integrated heat exchanger type in which the pressure vessel is provided with only a small number of extraction openings, the heat exchanger blocks are carried on a rotary support.

NUCLEAR REACTOR WITH INTEGRATED HEAT EXCHANGERS

The heat exchanger blocks are either place on rotary ring beams placed around, beneath or above the reactor core or suspended from a central manifold which is also rotatable.

The present invention is concerned with a nuclear reactor of the integrated heat exchanger type in which the heat exchangers as well as the blowers or pumps employed for circulating the primary coolant through the reactor core are placed inside the core containment vessel, whilst the secondary fluid is admitted into and discharged from said heat exchangers via ducts which traverse said vessel.

During operation of reactors of this type, no servicing or repair work can be performed on the cooling circuit inside the pressure vessel. Furthermore, in the event of any fault condition arising in any heat exchanger unit, it can prove necessary to enter into the pressure vessel after shutdown and cooling of the reactor, either for the purpose of carrying out a rapid repair or more generally for the purpose of isolating all or part of a damaged heat exchanger unit from the remainder of the circuit, the reactor being then restarted at slightly reduced power if necessary. Remedial work of this nature which is carried out inside the pressure vessel has the additional disadvantage of exposing personnel to radiations.

In order to be able to perform servicing or repair work on heat exchangers without entering into the pressure vessel, consideration has been given to the possibility of providing openings in the top of the reactor so that each opening can permit the removal of any one heat exchanger unit. However, the large number of openings thus entailed complicates the construction. Consequently, such a solution cannot usually be adopted unless provision is made for a small number of heat exchanger units, and is therefore of practical interest only in the case of low-power reactors.

The object of this invention is to overcome the above-noted disadvantages by permitting the withdrawal of any one heat exchanger unit although the pressure vessel is provided only with a minimum number of extraction openings which, in certain cases, can even by limited to a single opening.

This invention is directed to a nuclear reactor which essentially comprises within the pressure vessel and between said vessel and the reactor core a support on which the heat exchanger units are carried but not rigidly fixed thereto and which is coaxial with the pressure vessel and capable of rotating with said heat exchanger units about their common axis, and means for producing the simultaneous movement of rotation of said heat exchanger units and said support.

In a preferred embodiment, the reactor comprises a perforated skirt which is fixed within the pressure vessel and adapted to carry the heat exchanger support by means of ball-bearing raceways.

In accordance with another feature of the invention, the support comprises elements which are provided with slots at the sides as well as in their top and bottom faces for the circulation of cooling fluid and are each provided with grooves for the sliding motion of guide lugs which are integral with one of the heat exchanger units.

In an alternative embodiment, the support forms a ring beam around the reactor core and the perforated skirt is adapted to carry the units for controlling the circulation of fluid.

In another alternative embodiment, the support comprises a plurality of rings of elements forming a plate which is located transversely with respect to the axis of the pressure vessel.

The movement of rotation of the support which carries the heat exchanger units thus makes it possible to bring any one heat exchanger unit beneath the extraction opening. The pressure vessel need be provided only with a single extraction opening per annular assembly of heat exchanger units in order to permit the withdrawal of any one damaged unit. Rotary drive to the support can be effected from the exterior of the pressure vessel by means of a mechanical system which passes longitudinally through this latter up to the support, thereby entailing the need to disconnect the secondary circuit from each heat exchanger unit, preferably from the exterior of said pressure vessel prior to driving the support in rotation.

However, in order to simplify this operation, and in accordance with yet another alternative embodiment of the invention, the heat exchanger units are connected to a single central manifold which is rotatably mounted in the bottom or in the cover of the pressure vessel. Only the outlet ducts of said manifold need therefore be disconnected and even the rotary drive can be effected from the manifold itself, in which case the support rotates with the heat exchanger units.

A number of other properties and advantages of the invention will in any case become apparent from the following description of exemplified embodiments which are given without limitation and illustrated in the accompanying drawings, wherein.

Figure 1:
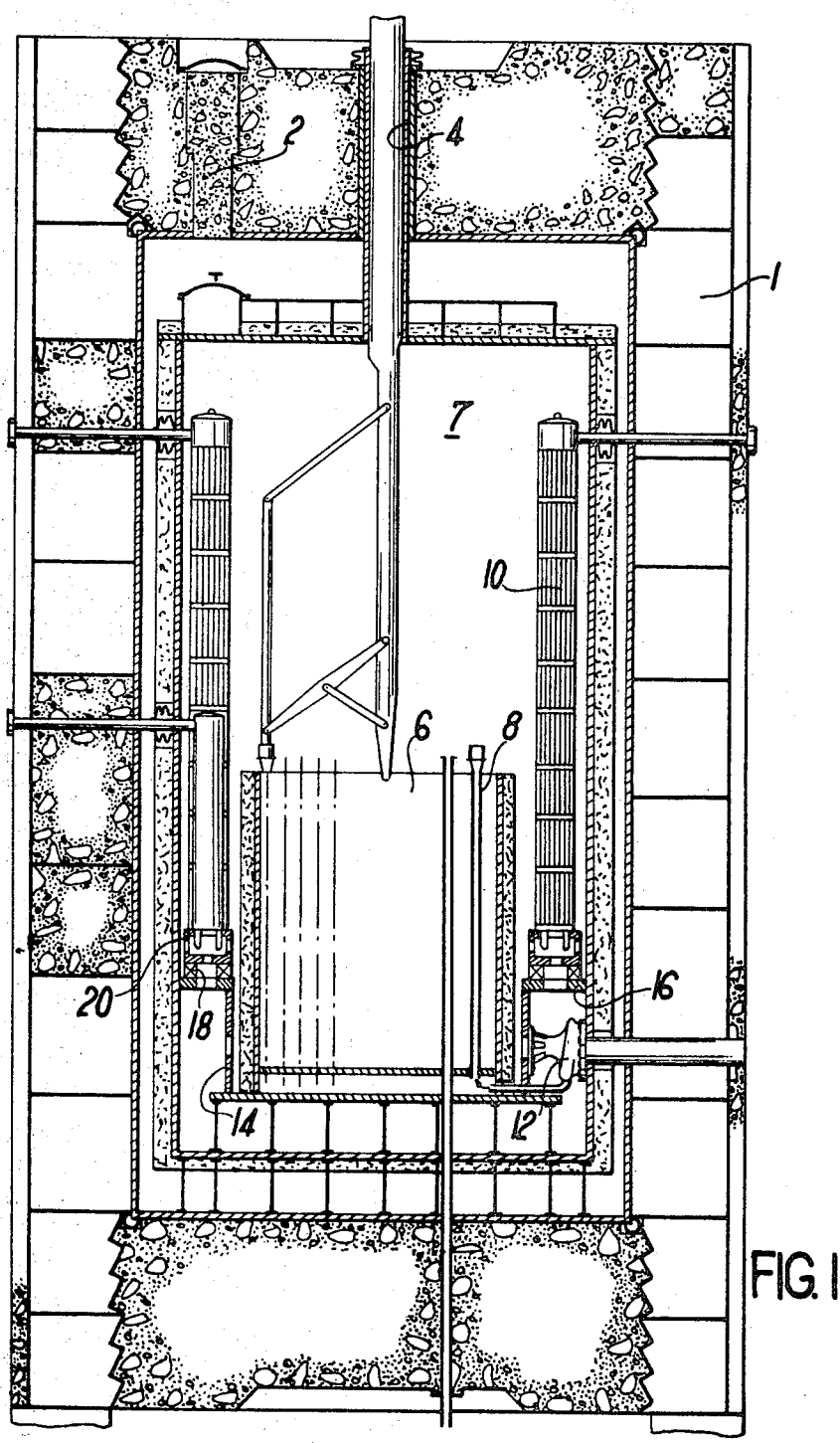
FIG. 1 is a longitudinal sectional view of a nuclear reactor with integrated heat exchanger units which are disposed in a circle around the reactor core.

The nuclear reactor which is illustrated in FIG. 1 comprises a pressure vessel 1 of prestressed concrete having at the top at least one opening 2 for the withdrawal of heat exchanger units and a central opening 4 providing a passageway for the fuel element handling device, and a reactor core 6 surrounded by heat exchanger units 10 which are disposed in a circle.

The reactor core 6 may, for example, be a calandria tank filled with a neutron-moderating liquid such as heavy water, said calandria tank being traversed by tubes 8 which contain the fuel elements, a cooling fluid which can be either a gas or a vaporizable liquid being circulated through said calandria tubes.

Said cooling fluid which is heated within the reactor core passes out at the top portion 7 of the inner container so as to be collected in the heat exchanger units 10 in which said fluid is cooled. Pumps 12 located at the bottom of the pressure vessel return the coolant to the calandria tank 6.

Figure 2:
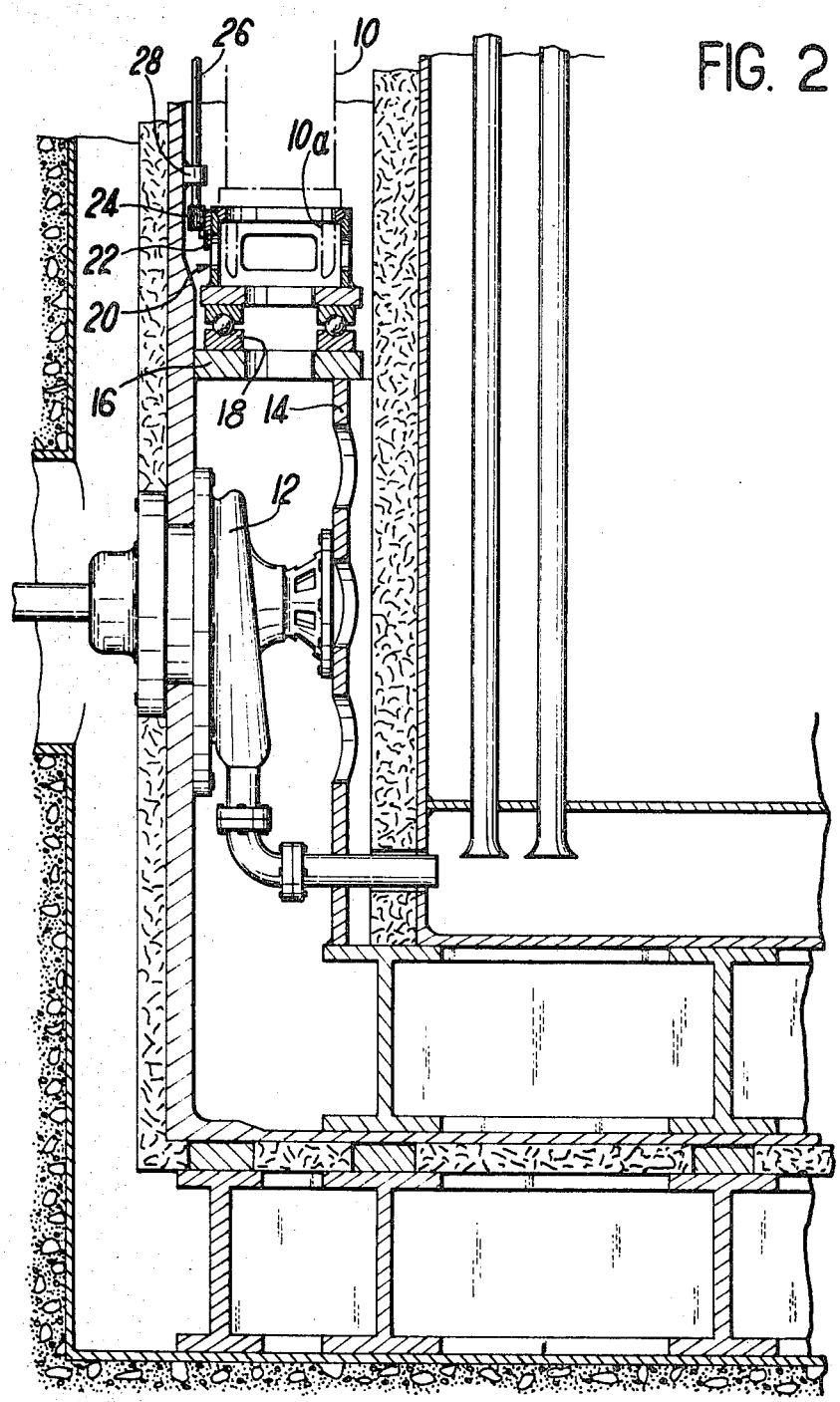
FIG. 2 is a partial detail view on a larger scale and also in longitudinal section showing a heat exchanger unit support.

The pumps are fixed on a perforated annular skirt 14 which is disposed coaxially with the reactor core 6 and on which is carried an annular perforated plate 16 fixed between said skirt and the inner containment wall of the pressure vessel. Structural beam elements 20 having slots in the sides as well as the bottom and top faces are carried on said annular plate 16 by means of two concentric ballbearing race rings 18. Grooves formed in the beam elements permit the sliding engagement of lugs 10a which form feet for the heat exchanger units 10 (as shown in FIG. 2). Said structural beam elements 20 are joined together by means of bolted and welded joints, for example, and in such a manner as to form a continuous annular support for the heat exchanger units. The ring beam thus formed is rigidly fixed at its periphery to a spur-tooth crown wheel 22 which is in meshing relation with uniformly spaced pinions 24, said pinions being each keyed on a shaft 26 which is mounted in bearings 28 carried by the pressure vessel wall. Said shafts 26 extend longitudinally through the vessel and are coupled at the exterior to a removable rotary drive system which is not shown in the drawings.

The rotation of each shaft 26 is accompanied by the movement of rotation of the ring beam formed by the elements 20 and makes it possible to displace the heat exchanger units through any desired angle so as to bring one of said units into position directly beneath an extraction opening 2. Any particular heat exchanger unit which may have incurred damage may thus be withdrawn from the pressure vessel after shutdown and cooling of the reactor.

Only a very small number of extraction openings need be provided, a single opening being in fact the minimum requirement.

Figure 3:
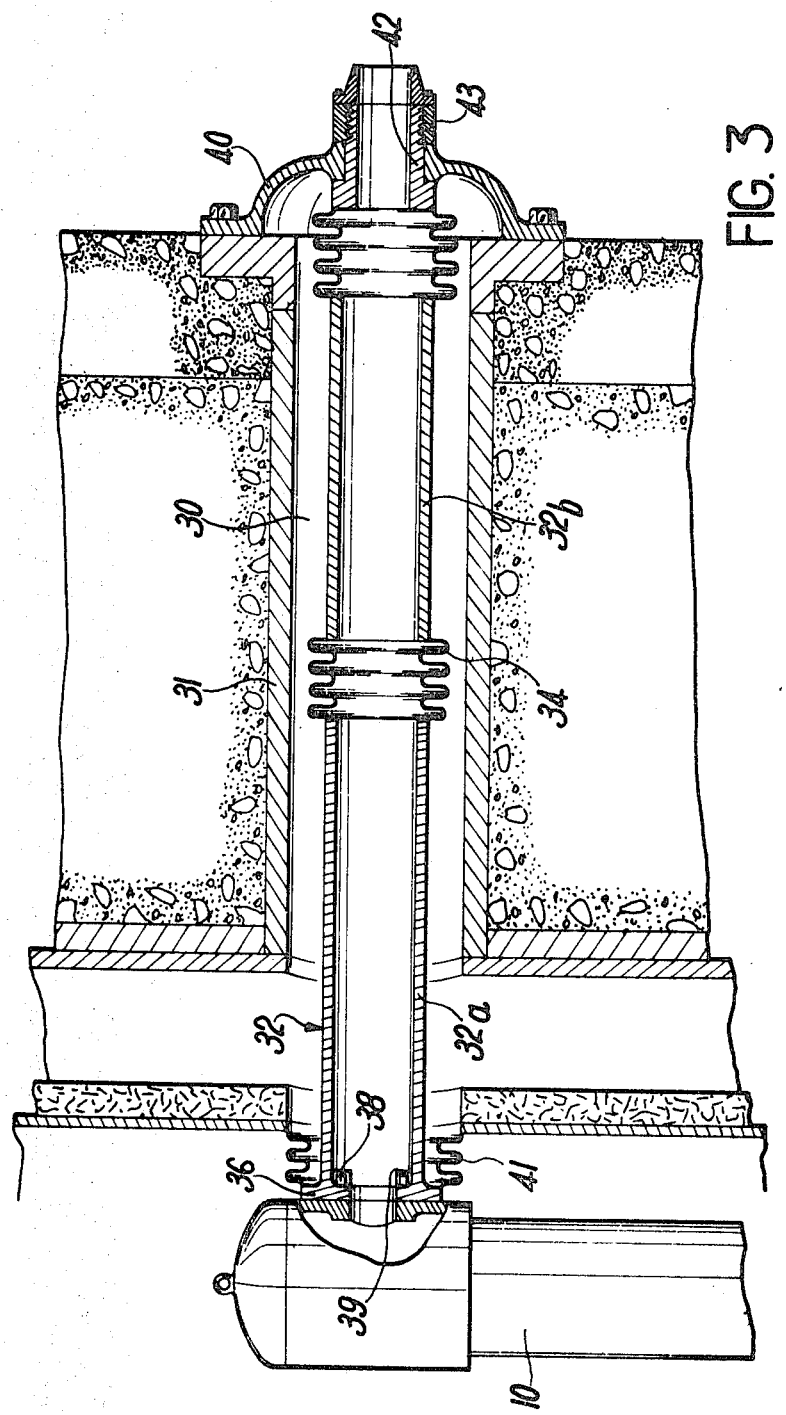
FIG. 3 is a detail view on a larger scale showing the connection of the secondary circuit of a heat exchanger unit with the exterior.

The heat exchanger units simply rest on the support 20 and no dismantling is necessary in this part of the reactor. However, each heat exchanger unit comprises a secondary heat-removal circuit which is connected to the exterior of the pressure vessel and traverses the vessel wall through an opening 30 which is lined with a tubular shell 31 (as shown in FIG. 3). A through-tube 32 is placed inside said opening 30 and is made up of a number of similar sections 32a, 32b, for example, which are joined to each other by means of bellows-type expansion seals 34. Said through-tube is fitted at one end with a T-section flange 36 and secured to the heat exchanger unit 10, preferably by means of bolts 38.

A bellows seal 41 is mounted inside the pressure vessel between the flange 36 and the inner containment wall of this latter whilst a leak-tight cap 39 is intended to cover the bolts 38 inside the tube 32. An extension is provided at the other end of said tube 32 in the form of a threaded sleeve 42 which is clamped by means of a nut 43 against a flange 40 in the form of a spherical cap for the purpose of closing the opening 30 at the exterior of the pressure vessel.

Each heat exchanger unit can thus be separated from the external secondary fluid circuit by unscrewing the bolts 38 after withdrawal of the cap 39, this operation being carried out from the exterior of the pressure vessel by means of a tool which is designed to penetrate into the interior of the through-tube 32. Said tube is then withdrawn up to the vessel wall and maintained in this position, the bellows seal 41 being compressed by the flange 36 and the heat exchanger unit 10 is thus freed. All the exchanger units are thus disconnected without any need to enter into the vessel prior to driving the support 20 in rotation.

A new heat exchanger which replaces the unit which has just been withdrawn will readily be connected by releasing the bellows seal 41, applying the flange 36 against the heat exchanger and replacing the bolts 38 as well as the cap 39.

Figure 4:
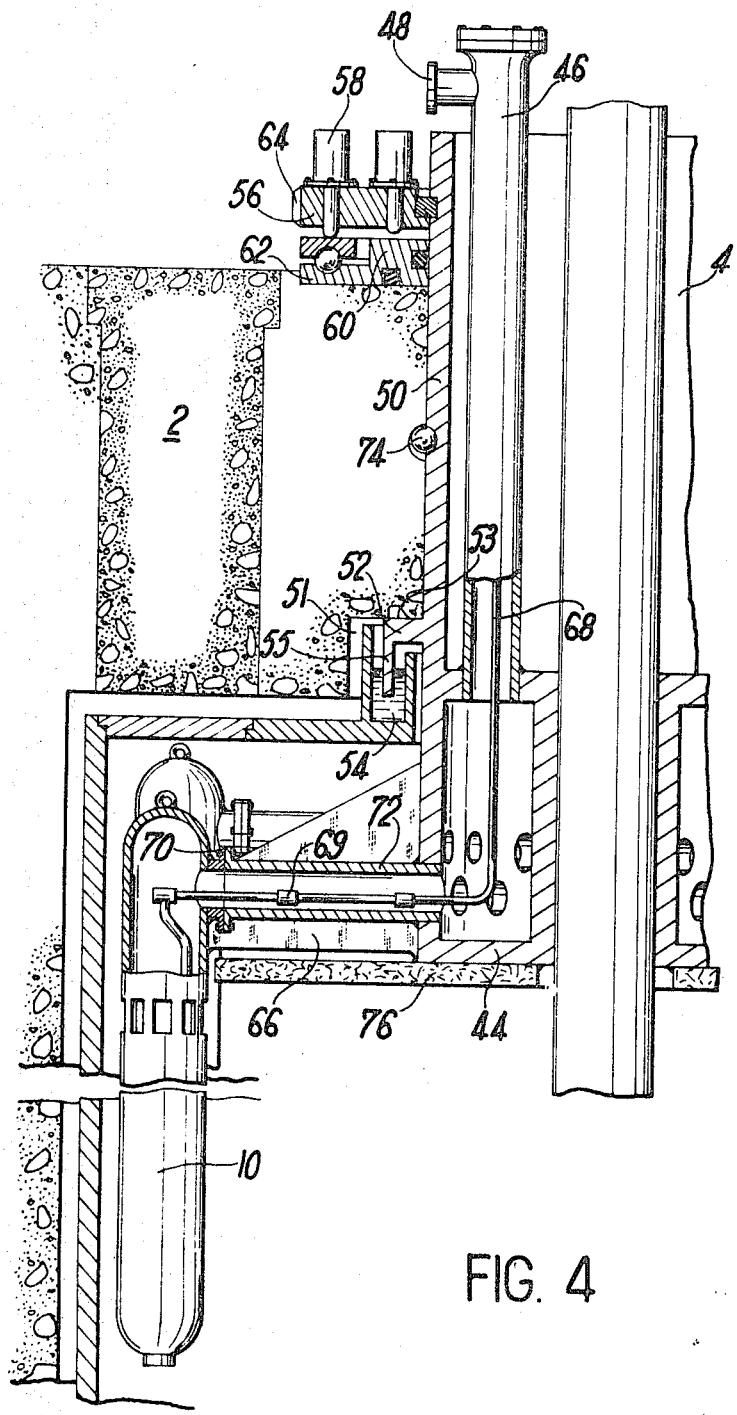
FIG. 4 is a partial view and also in longitudinal section showing an alternative embodiment in which the heat exchanger units are connected to a single manifold.

However, it can be an advantage in some cases to avoid this plurality of disconnection operations by coupling all the heat exchanger units within the pressure vessel to a single central manifold 44 (as shown in FIG. 4). In the case of the reactor which is illustrated in FIG. 1, this manifold has an annular shape and is disposed around the passageway 4 which is provided for the handling device. The manifold proper extends outwardly through the pressure vessel wall in a series of conduits 46 of relatively large diameter which are connected to the heat-removal circuit by means such as detachable flanges 48. The number of said conduits as well as the number of flanges is distinctly smaller than the number of heat exchanger units, with the result that the number of operations required in order to separate the outlets of the heat exchangers from the secondary fluid circuit is reduced accordingly.

The complete assembly of manifold and conduits 46 is fixed inside a hollow cylinder 50 which is rotatably mounted in the top wall of the pressure vessel. Said tube 50 also serves as a passageway for pipes 68 for the admission of the cold secondary fluid to the heat exchanger units. Said pipes 68 can be mounted inside the conduits 46 or simply between said conduits and the tube 50.

Outside the pressure vessel, the tube 50 is rigidly fixed to an annular member 56 which is supported by means of adjustable jacks 58 on the one hand on a stationary annular member 60 which is rigidly fixed to the pressure vessel and, on the other hand, on a ballbearing 62 which permits the rotation of said annular member 56 relative to said pressure vessel. The annular member 56 can be rigidly fixed to an externally-toothed wheel 64 which is driven in rotation by means of a suitable drive mechanism.

The movement of rotation of the toothed wheel which is accompanied by the rotation of the annular member 56 and tube 50 accordingly initiates the rotation of the manifold 44 which produces the displacement of the heat exchanger units 10.

In order to prevent deformations of the conduits 72 which connect the heat exchanger units 10 to the manifold 44, rigid support arms 66 are mounted between the manifold and the heat exchangers.

Within the interior of the pressure vessel, leak tightness of the passage of the tube 50 as well as leak tightness of this latter in relative motion are provided by means of a hydraulic seal mounted in an annular recess 51 of the pressure vessel and comprising an annular flange 52 having a cross section in the shape of an inverted L and forming on the one hand an annular shoulder 53 in abutment against the recess and, on the other hand, a ring 55 extending downwards into an annular trough 54 which is fixed inside said recess and filled with a liquid.

A collection of balls 74 placed in an annular groove of the pressure vessel wall and adapted to penetrate into a corresponding groove of the tube 50 has the function of supporting the rotary assembly in case of disassembly of the annular members 56 and 60 for the purpose of renewal of the rotary seals placed within the annular member 60.

In this form of construction, the entire tube 50 rotates together with the heat exchanger units in order to bring into position beneath an opening 2 any damaged heat exchanger unit which must then be disconnected separately from the manifold 44.

To this end, demountable flanges 70 serve to connect each heat exchanger block 10 to the conduit 72 through which hot secondary fluid is discharged to the manifold. Said flanges 70 can be separated either from the extraction opening 2 or from the interior of the manifold 44. Moreover, the admission pipe 68 is made up of a number of sections which are joined together at 69 and which can readily be dismantled.

A biological shield plate 76 which is fixed to the manifold 44 and extends to the heat exchanger units 10 serves to protect the operator against any residual radioactivity emanating from the reactor core.

The new or repaired heat exchanger which is inserted through the opening 2 will be connected in the same manner by replacing the unions 69 of the admission pipes 68, by fastening the flanges 70 by means of bolts and even complementary welding of said flanges. The heat exchanger unit can then be returned to its operating position by rotating the complete assembly which consists of the tube 50 and heat exchangers 10. After plugging the opening 2 and coupling the flanges 48, the reactor can then be restarted at its initial power level, the cooling circuit being exactly the same as before.

It is readily apparent that the invention is not limited to an arrangement in which the heat exchanger units 10 are disposed in a circle around the reactor and that the rotary support permits the displacement of any other arrangements of heat exchangers.

Figure 5:
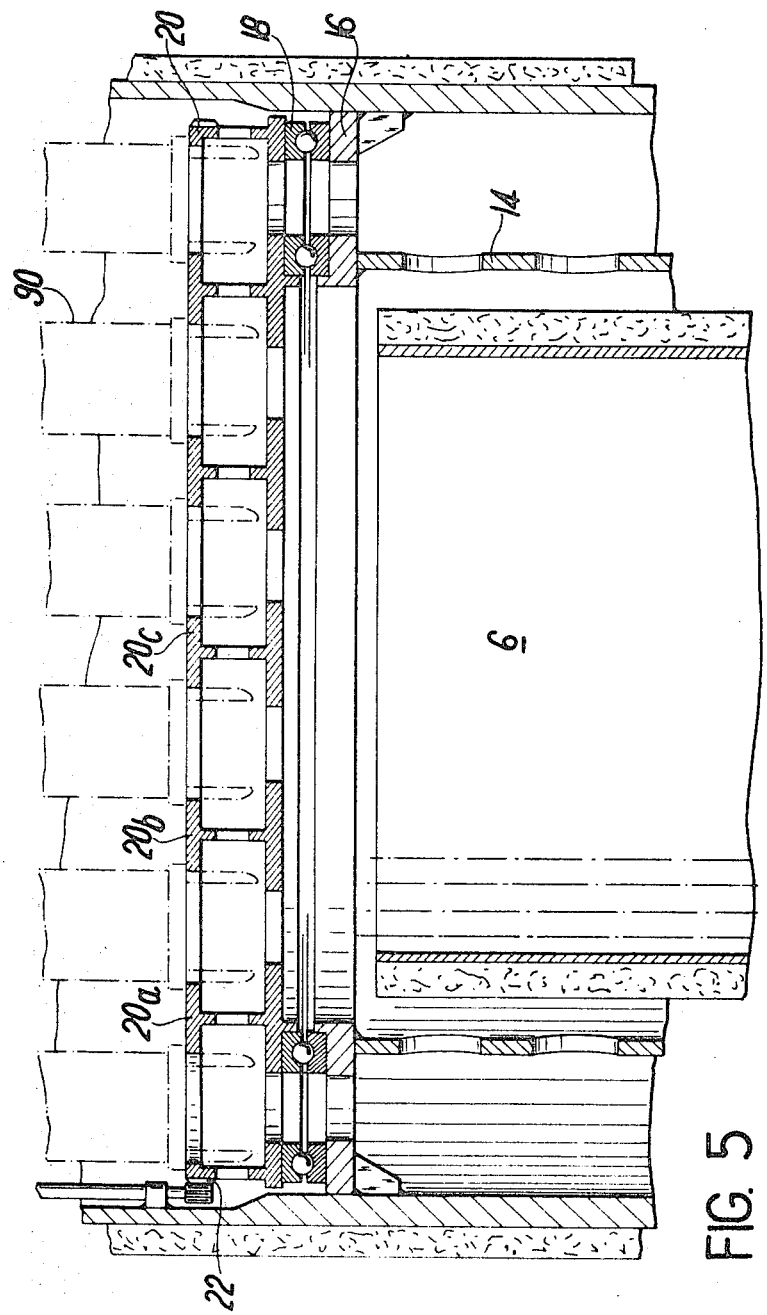
FIG. 5 is a partial view, also in longitudinal section, showing a nuclear reactor in which the heat exchanger units are disposed above the reactor core.

FIG. 5 shows one example of construction in which the heat exchanger units 10 are disposed in a plurality of annular assemblies above the reactor core and mounted on a support 20 made up of elements which are identical with those of FIG. 1. Said support elements are disposed in concentric rings 20a, 20b, 20c which are rigidly fixed to each other and carried by the two ball bearing rings 18, said rings being in turn carried by the annular plate 16 on the perforated skirt 14 which is concentric with the reactor core. As in the embodiment of FIGS. 1 and 2, the support 20 is rigidly fixed to a crown wheel 22 and driven in rotation by means of this latter.

However, in the same manner as the heat exchanger units 10 of FIG. 4, the units 90 of all the annular assemblies of FIG. 5 could be connected to a single central manifold which forms part of the heat exchanger support and rotates therewith, in which case the bottom support structure 20 is dispensed with.

Figure 6:
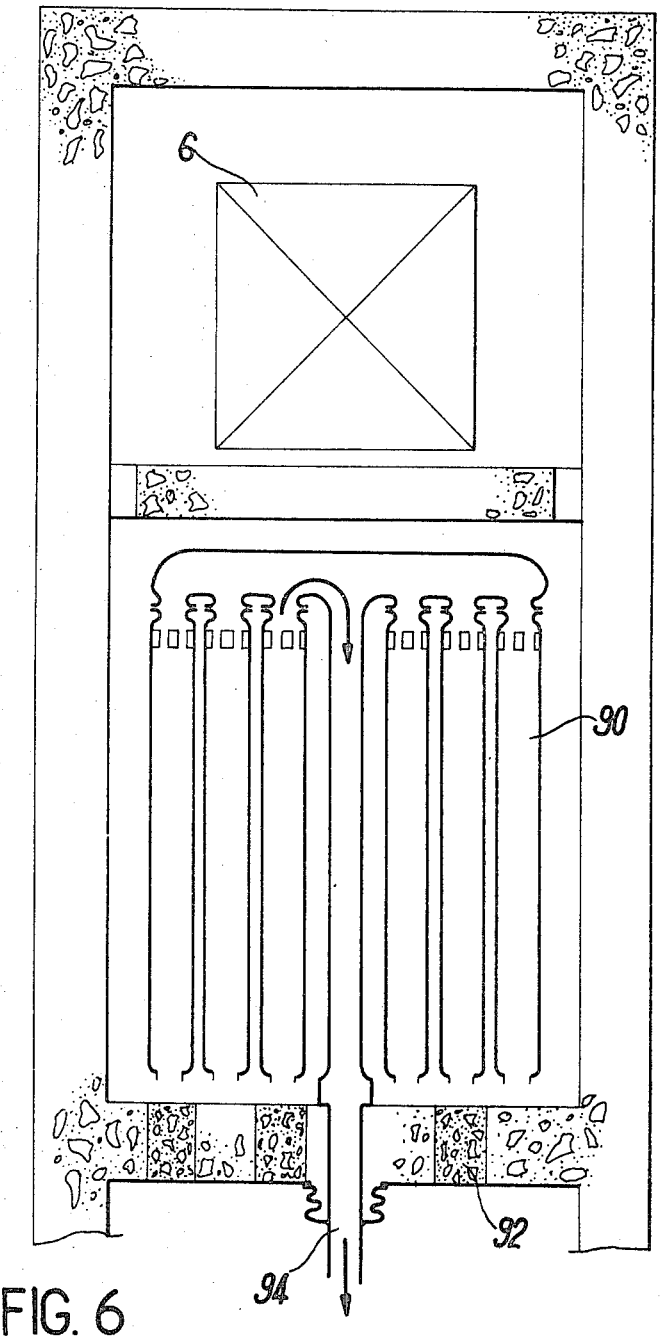
FIG. 6 is a longitudinal sectional view of another alternative embodiment.

FIG. 6 shows an example of construction of an arrangement of this type in which the heat exchanger units are mounted beneath the core; it will nevertheless be understood that heat exchangers placed above the core could be supported in a similar manner.

In the embodiment which is illustrated in FIG. 6, the extraction openings 92 of the heat exchanger units 90 are pierced in the base of the pressure vessel which is traversed at the center by a manifold 94 which provides an outlet for the secondary circuit from the heat exchangers. Said manifold 94 is joined to the top portion of each heat exchanger unit 90 by means of an arm 66 and is mounted in the same manner as the manifold 44 within a through-tube which is traversed by the pipes for the admission of cool secondary fluid and which is intended to rotate within the opening of the pressure vessel and to drive the complete assembly of heat exchanger units 90.

A number of different modifications could in any case be made in the embodiments which have just been described without thereby departing from the scope of the invention. For example, the heat exchangers could be suspended from the rotary support 20 instead of simply resting on this latter. Alternatively, in certain cases, the manifold 44 could be extended to the exterior of the pressure vessel, in which case the conduits 46 would have to be dispensed with and provision made for a very small number of outlet connectors to the heat-removal circuit.

Irrespective of the form of construction adopted and the arrangement of the heat exchangers relative to the reactor core, one extraction opening per annular assembly of heat exchanger units is necessary in order to permit the withdrawal of any one unit.

We claim:

1. A nuclear reactor of the integrated heat exchanger type comprising a prestressed concrete pressure vessel for the reactor, heat exchanger units in said vessel, at least one off-center opening for the withdrawal of any one of said heat exchanger units through one end of said prestressed concrete pressure vessel, a heat exchanger support within said vessel coaxial with said vessel, said heat exchanger units being mounted on said support, said support being rotatable about the common axis of said heat exchanger units and means for rotating said support and said heat exchanger units to bring each of said units opposite said opening and to return each of said units to its operating position.

2. A reactor as described in claim 1 including ball bearings supported by said pressure vessel and carrying said support.

3. A reactor as described in claim 1 including a peripheral toothed crown wheel on said support, at least one pinion meshed with said wheel, a shaft mounting said pinion and a removable drive unit coupled to said shaft and rotating said shaft from the exterior of said pressure vessel.

4. A reactor as described in claim 1 including a perforated skirt within said vessel and carrying said heat exchanger support and ball bearing rings between said skirt and said support.

5. A reactor as described in claim 1 including feet for said heat exchanger units engaging said support and slidably fitted in grooves in said support.

6. A reactor as described in claim 5 including elements forming said support, slots in the sides, tops and bottoms of said elements for the circulation of a cooling fluid, grooves in said elements and guide lugs on each of said heat exchanger units sliding in said grooves.

7. A reactor as described in claim 4, said support being a ring beam around the reactor core and said perforated skirt carrying said units and controlling the circulation of a cooling fluid.

8. A reactor as described in claim 1, said support comprising a plurality of ring elements forming a plate located transversely of the long axis of said pressure vessel.

9. A reactor as described in claim 3, said shaft extending longitudinally through the reactor and being coupled at the top of said pressure vessel to said removable drive unit.

10. A reactor as described in claim 1 including a central secondary fluid manifold rotatively mounted on an end wall of said pressure vessel coupled to and supporting said heat exchanger units.

11. A reactor as described in claim 10 including arms for said manifold supporting said heat exchanger units and cooling fluid circulation ducts extending between said arms.

12. A reactor as described in claim 1 including means for connecting each of said heat exchanger units to a heat removing circuit outside said pressure vessel, said means including a tube passing through the wall of said vessel and demountable from the exterior of said vessel.

13. A reactor as described in claim 12, said tube comprising a plurality of sections disposed end to end and bellows expansion seals coupling said sections, one of said sections being connected to the adjacent one of said heat exchanger units and another of said sections being fixed on a flange secured to said pressure vessel, said one of said sections being joined to said vessel by a protective bellows seal.

14. A reactor as described in claim 10, said manifold being rigidly fixed to a biological shield element separating said manifold and the reactor core.